United States Patent [19]

Saint et al.

[11] Patent Number: 5,741,021
[45] Date of Patent: Apr. 21, 1998

[54] STROLLER HAVING A BREAK-AWAY BASKET

[75] Inventors: Nathanael Saint, Morgantown; Robert Tor Pike, Reading, both of Pa.

[73] Assignee: Graco Children's Products Inc., Elverson, Pa.

[21] Appl. No.: 528,760

[22] Filed: Sep. 15, 1995

[30] Foreign Application Priority Data

Sep. 21, 1994 [DE] Germany .............. 94-15275.6

[51] Int. Cl.⁶ .............................................. B62B 7/06
[52] U.S. Cl. ................ 280/47.38; 224/409; 297/188.21; 280/642; 280/650
[58] Field of Search ................ 280/47.38, 642, 280/644, 650, 658; 297/188.08, 188.21; 224/409

[56] References Cited

U.S. PATENT DOCUMENTS

| | | |
|---|---|---|
| 4,317,581 | 3/1982 | Kassai . |
| 4,817,982 | 4/1989 | Kassai ............................ 280/644 |
| 4,828,278 | 5/1989 | Nakao et al. . |
| 4,930,697 | 6/1990 | Takahashi et al. ............. 224/275 |
| 4,953,887 | 9/1990 | Takahashi et al. ............. 280/647 |
| 5,454,584 | 10/1995 | Haut et al. ..................... 280/642 |

*Primary Examiner*—Kevin Hurley
*Assistant Examiner*—Avraham Lerner

[57] ABSTRACT

A stroller has a break-away basket situated underneath the stroller seat or backrest. The basket has a frame pivotally mounted to the stroller frame, pivotal between a normally closed position to a lowered, open position. This is accomplished by pivoting one end of the basket frame downward to enlarge the basket access opening areas. When the basket is in the normal position, a pair of basket frame legs abut a corresponding pair of stops mounted on the stroller frame. The stops basically prevent the basket from pivoting downward. Forcing the basket frame legs past the stops lowers the basket. The basket may be restored to its normal position by forcing the basket frame legs back past the stops to their original position.

22 Claims, 2 Drawing Sheets

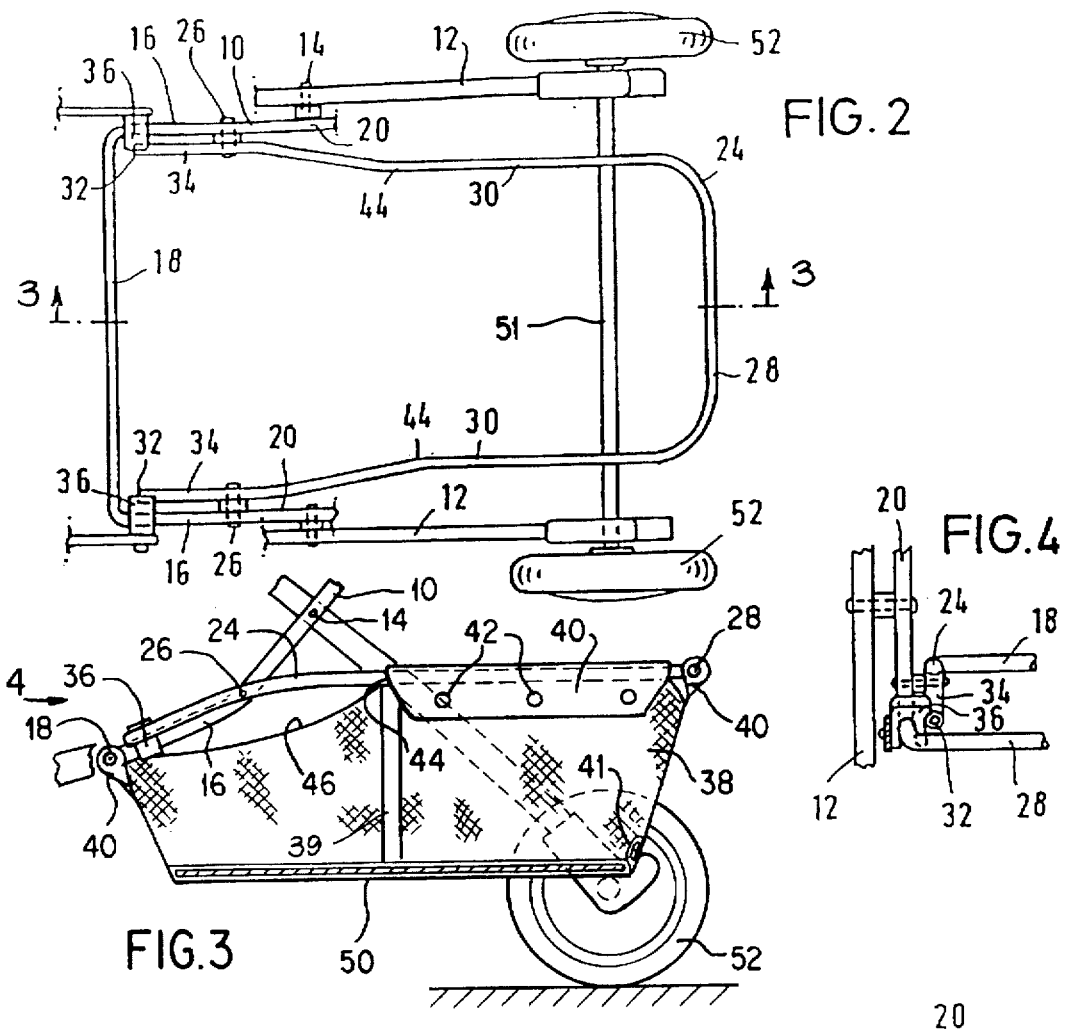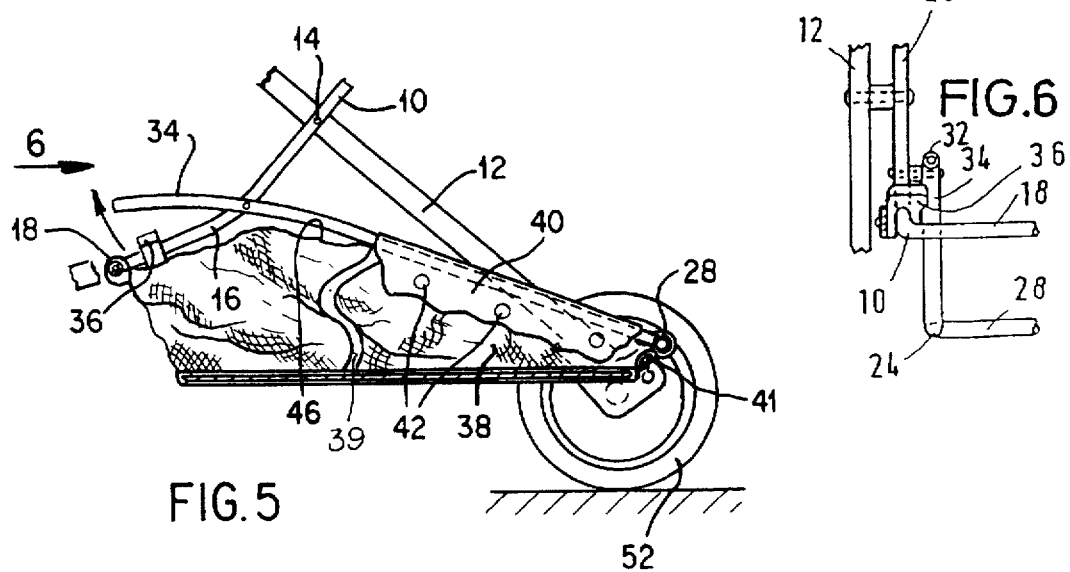

STROLLER HAVING A BREAK-AWAY BASKET

BACKGROUND

This invention relates to a stroller or carriage equipped with a basket underneath the seat or backrest for holding objects. More particularly, it relates to a collapsible stroller or carriage basket that can be lowered to facilitate insertion and removal of objects.

Collapsible strollers and carriages for children having baskets or other netting for receiving objects are well-known. Generally, the baskets are located either substantially underneath or behind the stroller seat. And as most baskets are designed to be loaded from the top, they are hard to access, especially when the seat is down or in the reclined position. Top loading baskets mounted behind the seat are more easily accessible because one need neither bend down to reach into them nor contend with the narrow space between the seat and the top opening, as is the case with baskets mounted underneath the seat. U.S. Pat. Nos. 4,317, 581 and 4,817,982 to Kassai, for instance, describe a top-loading basket mounted behind the stroller seat. U.S. Pat. No. 4,282,278 to Nakao et al. also shows a top-loading basket whose opening is behind the seat, which opening is defined by a basket frame that pivots upwardly when the stroller is collapsed. U.S. Pat. No. 4,952,887 to Takahashi et al. shows a removable top-loading basket having an opening situated substantially behind the seat. The basket is removed by releasing a pair of latches.

U.S. Pat. No. 4,930,697 to Takahashi et al. describes a collapsible stroller having a detachable top-loading basket mounted underneath the seat. The basket provides handgrips for allowing the user to employ the basket as a shopping basket upon its removal. Once loaded, the basket may be placed back in position for continued stroller operation. The basket design permits one to place and remove objects from the basket despite its top-loading design. Access to the basket when attached to the stroller is made possible via its rear wall, which is equipped with openable slide fasteners (e.g., zippers) situated on the upper half portions at the rear corners of the basket. Unfortunately, as the fasteners slide only part way down, it does not permit one to insert an object whose height is substantially the same as the basket height.

SUMMARY

A stroller according to the present has a break-away basket located below the stroller seat. The basket has a frame movably mounted to a stroller frame and is movable between a closed position and an open position to ease access to the basket. This enables the basket frame to move between a normal operating position (closed) to a lowered position (open) to facilitate insertion and removal of objects larger than could otherwise be placed within or retrieved through the basket access opening in the closed position. At least one stop is connected to either the stroller frame or the basket frame to maintain the basket frame in the closed position. Preferably, the stop is made of hard, rigid material such as nylon, and has a cam like arcuate abutting surface or surfaces. When a predetermined downward or upward force is applied to the basket frame, the stop cam surface deflects or bends the basket frame end or ends laterally, the basket frame clearing the stop to allow it to move to the open or closed position. This stop, however, can also be made of resilient material, such as rubber, that can be flexed instead of deflecting the basket frame when a predetermined force is applied to the stop to allow the basket frame to move to the open or closed position. Alternatively, the basket frame and the stop both can be made to deflect if desired.

The stroller preferably has a pair of spaced apart frame legs, with the stop mounted to each frame leg. The basket frame is substantially U-shaped, with a transverse member joined to a pair of side legs, which preferably terminate in free ends. The side legs pivotally mount to the frame legs so that the basket frame pivots about an axis substantially perpendicular to the stroller movement direction. Preferably, portions of the side legs near their free ends or the free ends abut the stops. In this respect, the distance from the transverse member to the pivotal mount is preferably greater than the distance from the side leg abutting portions to the pivotal mount to provide a greater leverage. This enables one to move the basket frame to the open and closed position by pushing down and pulling up, respectively, the basket-frame transverse member. The basket-frame free ends deflect or bend laterally toward each other to clear the stops.

When the basket is in the normal position, the stops abut the basket frame and prevent the basket from accidentally pivoting into the lowered position. When a sufficient force is applied, the basket frame side legs deflect past the stops, and the basket frame pivots from the normal position to the lowered position. By applying a sufficient force in the opposite direction, the side legs again initially deflect and engage the stops, restoring the basket to the normal position, the stops holding the side legs in place.

The stroller frame also has a frame cross-member connecting the first and second frame legs. The basket, which is preferably shapeless, is attached to the frame cross-member and the basket frame. The basket further includes a substantially stiff bottom, a portion of which is supported by the rear wheel axle. This helps to evenly distribute the load and prevent the basket from prematurely opening when loaded. The basket also has a back stiffener to prevent the rear edge of the bottom from catching underneath the rear wheel axle in the event that the basket is shifted forward.

BRIEF DESCRIPTION OF THE DRAWINGS

These and other features, aspects, and advantages of the present invention will become much more apparent from the following description, appended claims, and accompanying drawings where:

FIG. 2 is a top view of the lower part of the stroller showing a U-shaped basket frame.

FIG. 3 is a cross-sectional view of the stroller basket approximately taken along line 3—3 of FIG. 2, with the basket in the normal position.

FIG. 4 is a rear view taken in the direction of Arrow 4 of FIG. 3.

FIG. 5 is a cross-sectional view of the stroller basket corresponding to FIG. 3 with the basket in the substantially fully lowered position.

FIG. 6 is a rear view taken in the direction of Arrow 6 of FIG. 5.

DETAILED DESCRIPTION OF THE DRAWINGS

Figure 1:
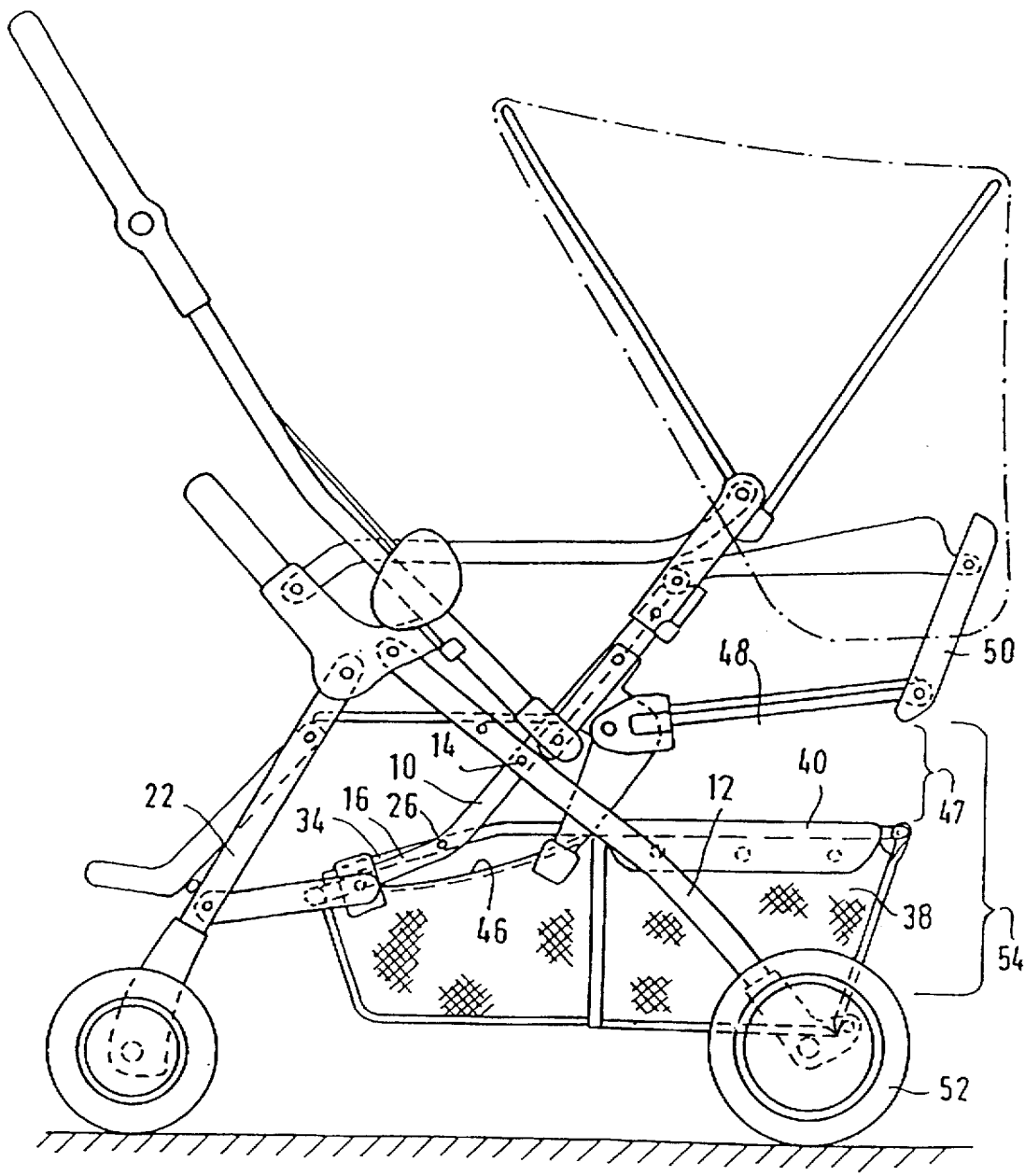
FIG. 1 is a side view of a stroller with the basket in the normal position.

As shown in FIG. 1, a collapsible stroller typically has a collapsible frame unit having a pair of front frame legs 22 supporting a pair of front wheels and a pair of rear frame legs 12 supporting a pair of rear wheels 52. The frame unit has a substantially U-shaped diagonal frame member 10 pivotally mounted to the rear frame legs 12 using screws or similar fasteners 14. These pivotal mounts permit the stroller to collapse for storage. As best shown in FIG. 3, the frame member 10 has a cross-member 18 extending between a pair of lateral frame legs 20. Each frame leg 20 has an angled or bent leg section 16, which is angled relative to its upper portion such that the angled leg section 16 is substantially more horizontal than its upper portion.

A substantially U-shaped basket frame 24, having a pair of basket side legs 30, is fastened to the U-shaped frame member 10 by means of screws 26, or the like such as rivets and bushings, approximately at the point where the frame legs 20 are angled. The basket frame 24 is fastened so that the basket pivot axis (formed by the pivot mount 26) is generally transverse to the stroller movement direction and substantially parallel to the stroller wheel axles when the stroller is moving in a straight line. In other words, the basket frame pivots about a plane substantially parallel to the stroller movement direction. As shown in FIG. 1, when the basket frame 24 is in the normal operating position (closed), a shapeless or formless basket 38 attached to the basket frame extends generally in a horizontal plane under the seat area and the backrest 50. And, as best shown in FIG. 2, the U-shaped basket frame 24 is somewhat narrower than the U-shaped frame member 10, so that the basket frame 24 is positioned inside the U-shaped frame member 10.

The side legs 30 are connected by a transverse member 28 at the back end of the basket frame, near the stroller end, below the backrest 50. At the basket front end, the side legs 30 each have an angled extension 34 terminating in a free end 32. In the preferred embodiment, the side legs 30 are downwardly angled in the portions where they are attached by screws 26 or the like to the frame legs 20 as shown in FIG. 3. The side legs 30 and the frame legs 20 are angled past the connection point (26) such that the angled extensions 34 and the angled leg sections 16 are substantially parallel when the basket frame is in the normal position shown in FIG. 3.

Mounted to each angled leg section 16 is a stop 36, preferably made of hardened plastic. As shown in FIGS. 2 and 4, the stop 36 is shaped so as to project into the movement path of each of the basket frame angled extensions 34. The stops 36 are mounted such that when the basket frame is in the normal position, the free ends 32 of the angled extensions 34 abut the stops from the side as shown in FIG. 4. In FIGS. 1–3, the U-shaped basket frame 24 with attached basket 38 is in the normal position when the free ends 32 of the angled extensions 34 abut the stops 36 from the side. As best shown in FIGS. 4 and 6, the inner side surface of the stop 36 is shaped so as to partially conform to the external contour of the angled extension 34. When a predetermined downward force is applied to the transverse member 28, the angled extensions 34 move up, pushing aside the partially conformal stops 36 and assuming the position shown in FIG. 5. Specifically, each stop has a substantially arcuate surface with an overhang near the top that holds the free end in a first position (basket frame closed position). Each stop's arcuate surface acts as a cam in deflecting the free end laterally inwardly and away from the stop when a predetermined force is exerted to move the free ends toward a second position (basket frame open position) as shown in FIG. 5. Alternatively, the stop may be made of resilient material so that it can be deflected instead of the basket frame ends. Also, the angled extensions 34 assume a higher position relative to the U-shaped frame member angled leg sections 16, but do not extend into the stroller seat because of the bend.

Of course, it should be appreciated that the stop could alternately be connected to a convenient location on the basket frame and be adapted to cooperate with the stroller frame. For example, a stop could be connected near the end of the angled extension and thus cooperate with the bent leg section 16 of the stroller frame. See FIG. 1.

When the basket is in the lowered open position, forcing the basket frame in the opposite direction has the same effect of deflecting the legs 36 once again and moving the angled extensions 34 back past the stops' overhangs to the normal position where the stops 36 abut the angled extensions and maintain the basket in this position. The basket remains in this normal position so long as no predetermined downward force or load is applied to the basket frame.

The degree of force that must be applied depends on the stop pliability and the stop position relative to the basket frame pivot axis (26) and the side leg length from the pivot axis to the transverse member 28. The side legs basically serve as levers. The predetermined force is defined as a force needed to release the basket frame from the stop or to engage into the stop. Such a force may be applied in any number of ways including overloading the basket, deliberately jerking the basket frame downward (upward) to move it into the lowered (normal) position, inadvertently stepping on the basket, and causing the stroller to go over bumps with load. Other ways may also be possible. To lessen the load accidentally pulling down the basket frame to the open position, the basket includes a substantially stiff bottom 50 that extends past the rear wheel axle 51, which supports the load so that impact from bumps will not prematurely lower the basket frame.

A net-like basket 38 is fastened to the basket frame 24. This shapeless basket 38 is provided at its top edges with tabs 40 preferably made of fabric. As shown in FIGS. 1, 3, and 5, the tabs 40 are folded around the transverse member 28 at the rear of the basket frame 24, around portions of the side legs 30 and around the frame cross-member 18 (front of the basket). The basket 38 is secured to the frame 24 by means of snap fasteners or the like attached to the tabs 40 and sidewall parts of the basket 38. Any suitable means for keeping the netting in place may be used.

The fabric tabs 40 attached at the top to the sides of the basket 38 and which are folded around the side legs 30, extend approximately from the transition of each side leg 30 to the transverse member 28 to the point 44 on each of the side legs 30 at which the basket frame angles somewhat outwardly. Between the two locations 44 where the side legs 30 angle outwardly and the frame cross-member 18, the basket 38 does not have any direct support. These two side areas 46 are loose and are free to stretch or fold, providing a flexible basket, which may deform in tandem with the basket frame 24 and also when the stroller is folded or opened. This design also allows the angled extensions 34 to pivot about the transverse basket pivot axis unrestricted by the basket and without disturbing it. Furthermore, the loose attachment of the folded tabs 40 to the basket frame 24 allows the upper edges of the basket to be moved relative to the basket frame 24, affording some flexibility when the stroller is folded and unfolded as external forces are applied. On either side of the basket a flexible webbing (strip) 39, which acts as a structural member that restricts lateral movement of the basket, is provided. This design thus provides a lateral stability.

In general, the basket frame transverse member 28 defines the upper edge of the basket at the rear of the stroller. Referring to FIG. 1, the space between the upper edge of the basket frame when it is in the normal position and the seat area 48 or backrest 50 is designated by 47. When the basket 38 is in the lowered position, as shown in FIG. 5, its upper edge drops toward the rear wheel axle 51. Lowering the basket increases the space between the basket's upper edge and the seat area 40 or backrest 50 to the space designated by 54. Thus, when the basket is in the lowered position, it may be loaded with objects which otherwise could not be placed within. After loading the basket 38, the basket can then be moved back into the normal position.

The present invention provides a flexible basket having somewhat greater length and depth than a basket situated beneath the stroller seat. Furthermore, the present invention also provides a facile means for accessing the basket interior. Thus, the present invention offers the dual benefits of a high capacity basket and the ability to store items larger than possible in the past.

In the preferred embodiment, the rear wheel axle 51 serves as a stop to limit the downward movement of the basket frame. This prevents the bottom edge of the basket from resting on the ground. Struts or similar devices, located around the wheels 52, can alternatively serve as a stop, if desired, to limit the downward movement of the basket frame. As shown in FIGS. 3 and 5, the basket 38 is slightly inclined or canted below the transverse member 28. The basket also has a back stiffener 41, which is contiguous to the rear edge of the bottom 50, to facilitate opening (set-up of) the stroller. This keeps the bottom 50 from getting trapped under the axle 51 in the event that the basket shifts forward and the rear edge of the bottom falls below the axle. The stiffener thus acts as an extension of the bottom to prevent the bottom from catching underneath the rear wheel axle.

When the basket 38 is in the lowered position, the upper edge sections of the basket 38 between the angled points 44 of the basket frame 24 and the pivot point (26) are not lowered as much as those areas secured to the basket frame 24 by tabs 40. Nevertheless, the space 54 is appreciably increased due to the pivoting experienced by the side legs.

The basket frame 24 with the attached basket 38 is mounted so that it does not hinder or prevent folding up the stroller. One feature of the present invention enabling this is that the angled extensions 34 and the angled leg sections 16 are parallel to one another and so do not interfere with each other when stroller is being folded or unfolded. Another is that the narrower U-shaped basket frame 24 pivots upward and nests within the wider U-shaped frame member 10 without encountering any other structural members when the stroller is collapsed. The relative rigidity of the basket frame 24 coupled with the pivotal nature of its movement also allows for larger storage capacity without unduly increasing either the size of stroller or its ease of operation.

The present invention permits the basket frame to be placed relatively closer to the underside of the seat and/or backrest. This allows one to provide a stroller with a basket having a greater depth and capacity than otherwise possible, with easy accessibility.

Yet another feature of the present invention is that despite the increased carrying capacity of the basket, there is no noticeable increase in size when the stroller is collapsed. Furthermore, when the stroller is opened, the basket automatically moves into its normal position.

A further feature of the present invention is that the stops automatically prevent one from damaging either the stroller or the basket by unintentional overexertion or even overloading. This is because the legs of the basket frame slip past the stops when the load becomes too great. For example, if one were to inadvertently step on the edge of the basket when it is in the normal position, the legs abutting the stops will be forced past the stops and the basket will open. Similarly, if one were to overload the basket frame or the basket and then try to restore it to its normal position, the basket would not stay closed because the legs would again slip past the stops due to the excessive load. Specifically, excessive load can flex the bottom such that the axle no longer supports the bottom, which load pulls down on the basket frame. This feature avoids damage to both the basket and the stroller.

Still another feature is the simplicity and ease of maintenance of the components used to realize the present invention. Generally, the stops may be replaced without incurring significant cost in either materials or time. Furthermore, the basket can be formed from a variety of materials ranging from relatively rigid metals and hard plastics to the most pliable netting.

Given the disclosure of the present invention, one versed in the art would readily appreciate the fact that there may be other embodiments and modifications well within the scope and spirit of the present invention. Accordingly, all expedient modifications readily attainable by one versed in the art from the present disclosure within the scope and spirit of the present invention are to be included as further embodiments of the present invention. The scope of the present invention accordingly is to be defined as set forth in the appended claims.

We claim:

1. A stroller comprising:
   a stroller frame having an extended and closed position;
   a basket frame including at least one side leg, which is adapted for supporting a basket, movably mounted to the stroller frame, the basket frame being movable between a closed position and an open position while the stroller is in the extended position; and
   at least one stop releaseably joining the stroller frame and at least one of the side legs of the basket frame together;
   wherein the stop maintains the basket frame in the closed position and wherein a predetermined force applied to the releases the basket frame from the stop thereby allowing the basket frame to move downward with respect to the stroller frame.

2. The stroller according to claim 1, wherein the stroller frame has a pair of spaced apart frame legs and one stop is mounted to each of the frame legs.

3. The stroller according to claim 2, wherein the basket frame is substantially U-shaped, with a transverse member joined to a pair of side legs, which terminate in free ends, the side legs being pivotally mounted to the frame legs such that the basket frame pivots relative to the frame legs.

4. The stroller according to claim 3, wherein portions of the side legs near their free ends or their free ends abut the stops.

5. The stroller according to claim 4, wherein the distance from the side leg abutting portions to the pivotal mount is smaller than the distance from the transverse member to the pivotal mount.

6. The stroller according to claim 4, wherein the stroller frame further comprises a frame cross-member connecting the frame legs.

7. The stroller according to claim 6, further including a basket, the basket being attached to the frame cross-member and the basket frame.

8. The stroller according to claim 1, wherein the stop deflects to allow the basket frame to move.

9. The stroller according to claim 1, wherein the basket frame deflects to allow the basket frame to move.

10. The stroller according to claim 1, wherein the stop is attached on the stroller frame.

11. The stroller according to claim 1, wherein the stop is attached to the basket frame.

12. In a stroller having an extended position and a closed position, a stroller frame having a pair of spaced apart frame legs, a seat with a back rest, and a basket frame mounted to the frame substantially underneath the seat, wherein:

the basket frame is substantially U-shaped, having a transverse member joined to a pair of side legs, which terminate in free ends, wherein the side legs are pivotally mounted the stroller frame legs; and includes at least one stop mounted to either one of the stroller frame legs or one of the side legs, wherein the one stop is adapted to abut against the other of either one of the stroller frame legs or one of the side legs, at least one stop releaseably joining the stroller frame and the basket frame together;

wherein the basket frame is pivotable between open and closed positions, the stop maintaining the basket frame in the closed position and wherein a predetermine fore applied to the stop releases the basket frame from the stop by allowing relative downward deflection between the stroller frame and the basket frame while the stroller remains in the extended position.

13. The stroller according to claim 12, wherein the stop is mounted to each of one frame legs.

14. The stroller according to claim 13, wherein portions of the side legs near their free ends abut the stops.

15. The stroller according to claim 14, wherein the side leg free ends deflect when the basket frame is moved from the closed or open position to the other position.

16. The stroller according to claim 14, wherein the stops deflect when the basket frame is moved from the closed open position to the other position.

17. A stroller comprising:

a stroller frame, the stroller frame having an extended and a closed configuration;

a child support portion;

a basket mounted below the child support portion and to the stroller frame, the basket having a transverse member and a free end;

a stop releaseably connecting the basket to the stroller frame, the transverse member being movable downward with respect to the stroller frame and the free end being movable upward with respect to the stroller frame while the stroller frame is in the extended configuration.

18. The stroller according to claim 17 wherein the stroller is collapsible.

19. The stroller according to claim 18 wherein the basket collapses when the stroller is collapsed.

20. The stroller according to claim 17 wherein the basket further comprises a bottom and wherein the transverse member is movable between a first vertical position and a second vertical position, the transverse member being closer to the bottom in the second vertical position.

21. The stroller according to claim 20 wherein the stroller is collapsible, and wherein the stroller expands from a closed configuration to an open configuration, and wherein the basket is in the first vertical position when the stroller is expanded from a closed configuration.

22. The stroller according to claim 17 wherein the basket further comprises a basket frame with the transverse member being a portion of the basket frame, the basket frame being pivotable with respect to the stroller frame.

* * * * *